(12) United States Patent
Uryu et al.

(10) Patent No.: US 7,671,584 B2
(45) Date of Patent: Mar. 2, 2010

(54) ROTATION ANGLE DETECTION DEVICE

(75) Inventors: Takuya Uryu, Toyko (JP); Kazuhisa Kurita, Tokyo (JP); Yoshihiko Onishi, Tokyo (JP); Shinya Nose, Tokyo (JP); Manabu Miyaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/449,823

(22) Filed: Jun. 9, 2006

(65) Prior Publication Data

US 2007/0229061 A1 Oct. 4, 2007

(30) Foreign Application Priority Data

Mar. 29, 2006 (JP) ............... 2006-091430

(51) Int. Cl.
*G01B 7/30* (2006.01)
(52) U.S. Cl. ................................ 324/207.25
(58) Field of Classification Search ............ 324/207.25, 324/207.2, 174; 123/617
See application file for complete search history.

(56) References Cited

U.S. PATENT DOCUMENTS

| | | | | |
|---|---|---|---|---|
| 6,407,543 | B1 * | 6/2002 | Hagio et al. ........... | 324/207.25 |
| 6,930,477 | B1 | 8/2005 | Kurita et al. | |
| 7,071,683 | B2 * | 7/2006 | Shimomura et al. .... | 324/207.25 |
| 2003/0020468 | A1 | 1/2003 | Kato et al. | |
| 2004/0035193 | A1 | 2/2004 | Morimoto et al. | |
| 2004/0061495 | A1 | 4/2004 | Shimomura et al. | |
| 2007/0090829 | A1 | 4/2007 | Kurita et al. | |

FOREIGN PATENT DOCUMENTS

| | | |
|---|---|---|
| DE | 10054123 A1 | 5/2001 |
| DE | 10234436 A1 | 3/2003 |
| DE | 102004031664 A1 | 9/2005 |
| DE | 102006007256 A1 | 4/2007 |
| DE | 102005061708 A1 | 6/2007 |
| EP | 1391598 A2 | 2/2004 |
| EP | 1403620 A2 | 3/2004 |
| JP | 01244314 A | 9/1989 |
| JP | 2001317909 A | 11/2001 |
| JP | 2003185471 A | 7/2003 |
| JP | 2004-332632 A | 11/2004 |
| JP | 2004-534244 A | 11/2004 |

* cited by examiner

*Primary Examiner*—Reena Aurora
(74) *Attorney, Agent, or Firm*—Sughrue Mion, PLLC

(57) ABSTRACT

The present invention attains downsizing of a permanent magnet with a simple structure to reduce a manufacturing cost thereof. Provided is a rotation angle detection device, including: a cylindrical magnetic circuit mounted to a shaft; and non-contact sensors provided in an inner void of the magnetic circuit, in which the magnetic circuit is composed of a first yoke and a second yoke formed of a magnetic material and having a pair of flat portions parallel and opposed to each other, and a pair of permanent magnets whose magnetic poles are aligned in the same direction so that magnetic fields whose magnetic fluxes are parallel to each other are generated in the void between the flat portions, and the non-contact sensor detects a rotation angle of the shaft by detecting a change in the direction of the magnetic fluxes.

8 Claims, 3 Drawing Sheets

ROTATION ANGLE DETECTION DEVICE

BACKGROUND OF THE INVENTION

1. Field of the Invention

The present invention relates to a rotation angle detection device equipped with a non-contact sensor that detects a rotation angle of a rotary member by detecting a change in the direction of a magnetic flux.

2. Description of the Related Art

In a known conventional rotation angle detection device for detecting a rotation angle of a throttle valve, an angle sensor is surrounded by a segment type permanent magnet, and the outer periphery of a pair of opposing permanent magnets is surrounded by a ring-shaped yoke (see, for example, JP 2004-332632 A (FIGS. 5 through 9).

In this conventional rotation angle sensor, by controlling the segment center angle of the permanent magnet to a predetermined value, it is possible to obtain, between the opposing permanent magnets, magnetic fields whose magnetic lines of force generated are parallel to each other. As a result, the influence of any positional deviation between the permanent magnet and the angle sensor on the output signal of the angle sensor is suppressed to a minimum.

In the above-described rotation angle detection device, however, the peripheral length of the permanent magnet is rather large, which leads to a large permanent magnet size, resulting in an increase in cost. Further, to attain high machining accuracy for the permanent magnet, the number of machining processes has to be increased.

SUMMARY OF THE INVENTION

The present invention has been made with a view toward solving the above problems in the related art. It is an object of the present invention to provide a rotation angle detection device, in which a peripheral length of a permanent magnet is reduced, to thereby achieve, for example, downsizing of the permanent magnet.

A rotation angle detection device according to the present invention includes a cylindrical magnetic circuit mounted to a rotary member, and a non-contact sensor provided in an inner void of the magnetic circuit. In the rotation angle detection device, the magnetic circuit is composed of a yoke formed of a magnetic material and having a pair of flat portions parallel and opposed to each other, and a pair of permanent magnets whose magnetic poles are aligned in the same direction so that magnetic fields whose magnetic fluxes are parallel to each other are generated in the void between the flat portions, and the non-contact sensor detects a rotation angle of the rotary member by detecting a change in the direction of the magnetic fluxes.

According to the rotation angle detection device of the present invention, the peripheral length of the permanent magnet may be reduced, whereby it is possible to attain effects such as downsizing of the permanent magnet.

DESCRIPTION OF THE PREFERRED EMBODIMENTS

Figure 1:
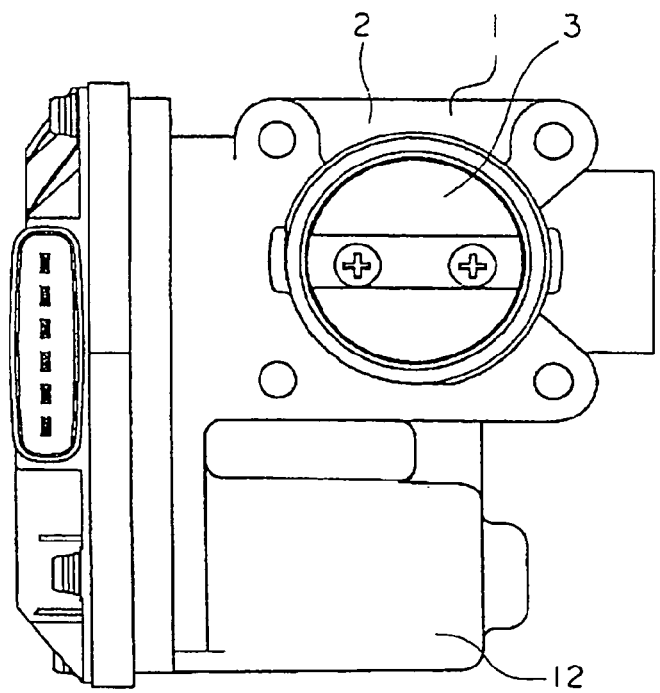
FIG. 1 is a front view of an engine intake control device in which a rotation angle detection device according to Embodiment 1 of the present invention is incorporated.

In the following, embodiments of the present invention will be described with reference to the drawings, in which the same or equivalent components and portions are indicated by the same reference numerals.

Embodiment 1

Figure 2:
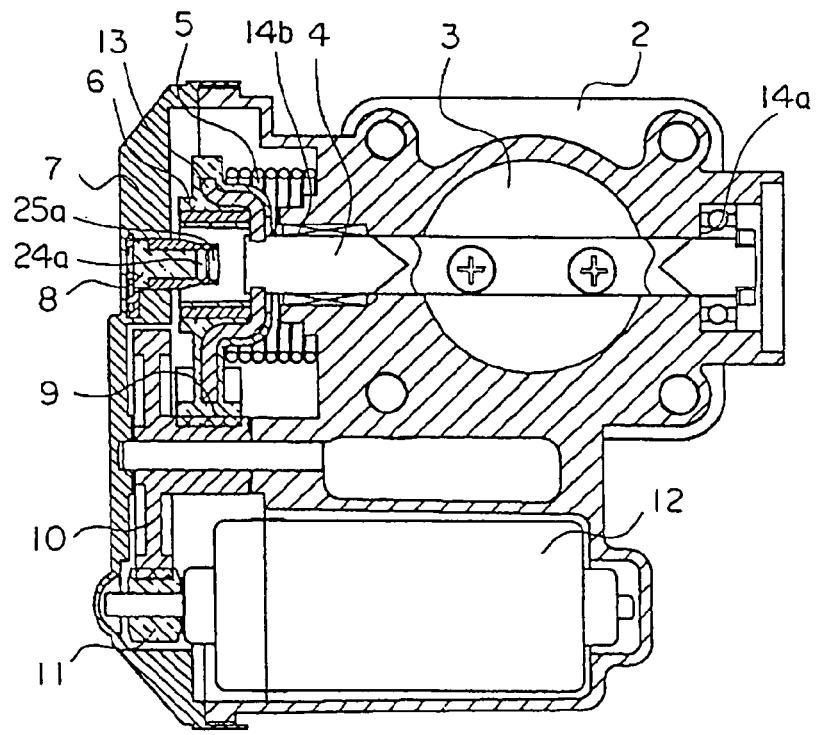
FIG. 2 is a sectional view of FIG. 1.

FIG. 1 is a front view of an engine intake control device in which a rotation angle detection device according to Embodiment 1 of the present invention is incorporated (hereinafter referred to as the intake control device), and FIG. 2 is a sectional view of FIG. 1.

In the intake control device 1, a spur gear 11 is fixed to the shaft of a drive motor 12 driven by a DC current. A resin reduction gear 10 is in mesh with the spur gear 11. The reduction gear 10 is in mesh with a sector-shaped resin throttle gear 9. A cup-shaped bottomed member 13 formed of a non-magnetic material is embedded in the throttle gear 9.

Figure 3:
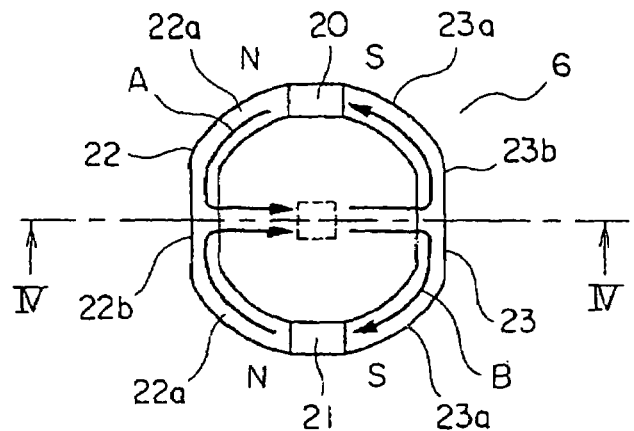
FIG. 3 is a plan view of a magnetic circuit shown in FIG. 2.
Figure 4:
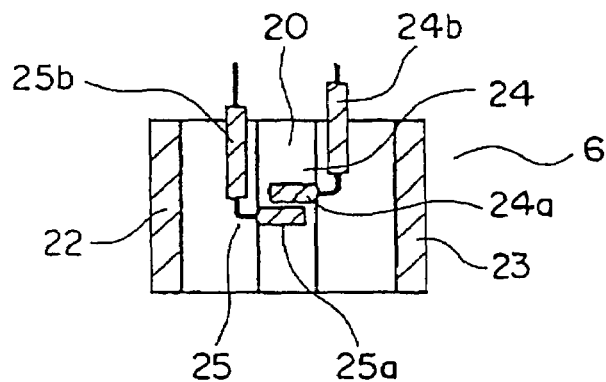
FIG. 4 is a sectional view taken along the arrow line IV-IV of FIG. 3.
Figure 5:
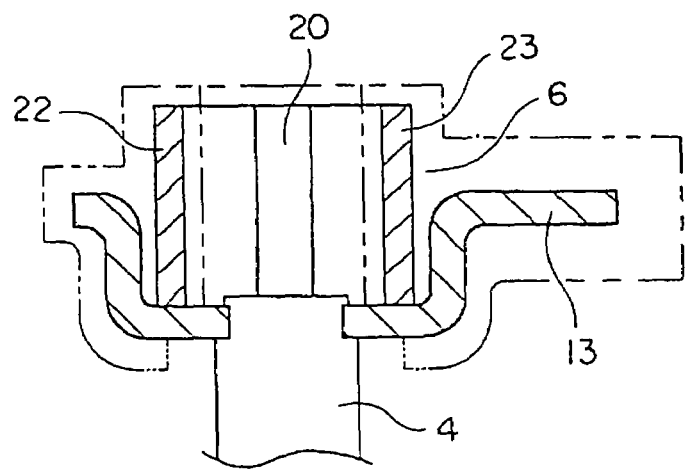
FIG. 5 is a diagram showing how a bottomed member and the magnetic circuit are integrated by insert molding.

Inside the bottomed member 13, there is provided a substantially cylindrical magnetic circuit 6 as shown in FIGS. 3 and 4. The magnetic circuit 6 and the bottomed member 13 are integrated with the throttle gear 9 by insert molding. The bottomed member 13 is fixed to an end of a shaft 4, which is a rotary member. The shaft 4 is rotatably supported in a body 2 with an intake passage through the intermediation of a first bearing 14a and a second bearing 14b. A throttle valve 3 is fixed to the shaft 4. The throttle valve 3 is constantly urged so as to close the intake passage by the elastic force of a spring 5 transmitted through the throttle gear 9.

Provided on one side of the body 2 is a cover 7 covering the spur gear 11, the reduction gear 10, and the throttle gear 9. The cover 7 is integrated by insert molding with a first non-contact sensor 24 and a second non-contact sensor 25 constituting a rotation angle detection device together with the magnetic circuit 6.

The magnetic circuit 6 is composed of a pair of first and second yoke portions 22 and 23 formed of a magnetic material and opposed to each other, and first and second permanent magnets 20 and 21 arranged, for example, such that both end surface sides of the first yoke portion 22 constitute N-poles and that both end surface sides of the second yoke portion 23 constitute S-poles. The first yoke portion 22 and the second yoke portion 23 are of the same configuration, each having curved portions 22a, 23a at both ends thereof and a flat portion 22b, 23b in the middle portion thereof. The first yoke portion 22, the second yoke portion 23, and the first permanent magnet 20, and the second permanent magnet 21 are of the same thickness, that is, of the same sectional configuration. The first non-contact sensor 24 and the second non-contact sensor 25 are arranged in the axis of the shaft 4, and are provided in the center line of the inner void of the magnetic circuit 6.

As a fail-safe measure, the first non-contact sensor 24 and the second non-contact sensor 25 are provided in a pair. The first non-contact sensor 24 is composed of a first magnetism detecting portion 24a containing a magnetoresistive element that detects the directions of magnetic fluxes from the first permanent magnet 20 and the second permanent magnet 21 to thereby detect the rotation angle of the shaft 4, and a first output operation portion 24b for performing an arithmetic operation on the output signal from the first magnetism detecting portion 24a.

The second non-contact sensor 25 is composed of a second magnetism detecting portion 25a containing a magnetoresistive element that detects the directions of magnetic fluxes from the first permanent magnet 20 and the second permanent magnet 21 to thereby detect the rotation angle of the shaft 4, and a second output operation portion 25b for performing an arithmetic operation on the output signal from the second magnetism detecting portion 25a.

In the intake control device constructed as described above, when the driver steps on the accelerator pedal, an accelerator opening signal from an accelerator opening sensor (not shown) is input to an engine control unit (hereinafter referred to as the ECU). The ECU energizes the drive motor 12 so that the throttle valve 3 attains a predetermined opening degree, and the shaft of the drive motor 12 rotates. Then, the spur gear 11, the reduction gear 10, and the throttle gear 9 rotate together with the shaft. As a result, the shaft 4, which is integrated with the throttle gear 9, rotates by a predetermined angle, and the throttle valve 3 is held at a predetermined rotation angle within the intake passage formed in the body 2.

On the other hand, the first magnetism detecting portion 24a and the second magnetism detecting portion 25a, which are of the magnetic flux direction detecting type, detect the directions of the magnetic fluxes from the first permanent magnet 20 and the second permanent magnet 21 rotating integrally with the shaft 4. Then, the output signals from the first magnetism detecting portion 24a and the second magnetism detecting portion 25a are subjected to an arithmetic operation in the first output operation portion 24b and the second output operation portion 25b, and are then transmitted to the ECU as an opening signal indicating the opening degree of the throttle valve 3. Based on this opening signal, the ECU makes a judgment as to how much fuel is to be injected into the cylinder.

The rotation range for the magnetic lines of flux between the flat portion 22b and the flat portion 23b ranges from 0°, which corresponds to the state in which the throttle valve 3 is in the totally closed state, to 90°, which corresponds to the state in which the throttle valve 3 is in the totally open state. Within this range, the first magnetism detecting portion 24a and the second magnetism detecting portion 25a respond to the rotation angle of the throttle valve 3 with linearity.

In the rotation angle detection device of the intake control device 1 constructed as described above, the magnetic flux generated from the first permanent magnet 20 flows in the direction of the arrow A of FIG. 3, that is, along a magnetic path formed by the N-pole of the first permanent magnet 20, the first yoke portion 22, the inner void, the first and second non-contact sensors 24 and 25, the second yoke portion 23, and the S-pole of the first permanent magnet 20.

The magnetic flux generated from the second permanent magnet 21 flows in the direction of the arrow B of FIG. 3, that is, along a magnetic path formed by the N-pole of the second permanent magnet 21, the first yoke portion 22, the inner void, the first and second non-contact sensors 24 and 25, the second yoke portion 23, and the S-pole of the second permanent magnet 21.

In the rotation angle detection device, which is thus equipped with the magnetic circuit 6, the first non-contact sensor 24, and the second non-contact sensor 25, the major portion of the magnetic fluxes generated by the first permanent magnet 20 and the second permanent magnet 21 passes through the first magnetism detecting portion 24a and the second magnetism detecting portion 25a provided in the inner void between the flat portions 22b and 23b parallel to each other, making it possible to substantially reduce the size of the first permanent magnet 20 and the second permanent magnet 21 as compared with that of conventional rotation angle detection devices.

Further, in the region of the first magnetism detecting portion 24a and the second magnetism detecting portion 25a arranged between the flat portion 22b and the flat portion 23b, there are generated magnetic fields whose magnetic fluxes are parallel to each other, so even if there is some positional deviation between the magnetic circuit 6 and the first and second magnetism detecting portions 24a and 25a, the output signals output by the first and second magnetism detecting portions 24a and 25a are little affected thereby.

Further, by changing the configuration of the first yoke portion 22 and the second yoke portion 23, it is possible to arbitrarily set the distance between the flat portion 22b and the flat portion 23b opposed to each other, and, by utilizing this distance, it is possible to adjust the density of the magnetic fluxes toward the first and second magnetism detecting portions 24a and 25a at a desired value.

Further, it is necessary for the magnetic circuit 6 to be integrated with the bottomed member 13 at a predetermined position by insert molding. In this process, the circumferential positioning of the magnetic circuit 6 within the mold is effected easily by utilizing the flat portion 22b and the flat portion 23b.

Further, as can be seen from FIG. 4, the first magnetism detecting portion 24a and the second magnetism detecting portion 25a are arranged at the center of the interior of the cylindrical magnetic circuit 6, so it is possible to suppress to a minimum the influence of an electromagnetic wave from the outside on the first magnetism detecting portion 24a and the second magnetism detecting portion 25a.

Further, the flat portion 22b and the flat portion 23b opposed to each other are of the same width and of the same wall thickness, so, even if the first and second magnetism detecting portions 24a and 25a are somewhat deviated from the central portion of the region where the magnetic fields whose magnetic fluxes are parallel to each other are generated, the output signals of the first and second non-contact sensors 24 and 25 are little affected thereby. Thus, the tolerance in the assembly precision between the first and second non-contact sensors 24 and 25 and the magnetic circuit 6 need not be so close.

While the flat portions 22b, 23b and the curved portions 22a, 23a are both of the same width and of the same wall thickness, the flat portions 22b, 23b may be made thinner than the curved portions 22a, 23a, that is, reduced in sectional area.

This makes the magnetic flux density of the flat portions 22b, 23b higher than that of the curved portions 22a, 23a, and the leakage magnetic flux in the flat portion 22b increases, so the magnetic fluxes toward the first and second magnetism detecting portions 24a and 25a increase, with the result that the magnetic flux density in the first and second magnetism detecting portions 24a and 25a increases. As a result, the influence of intrusion of an electromagnetic wave from the outside, which would adversely affect the detection error, is further reduced.

Embodiment 2

Figure 6:
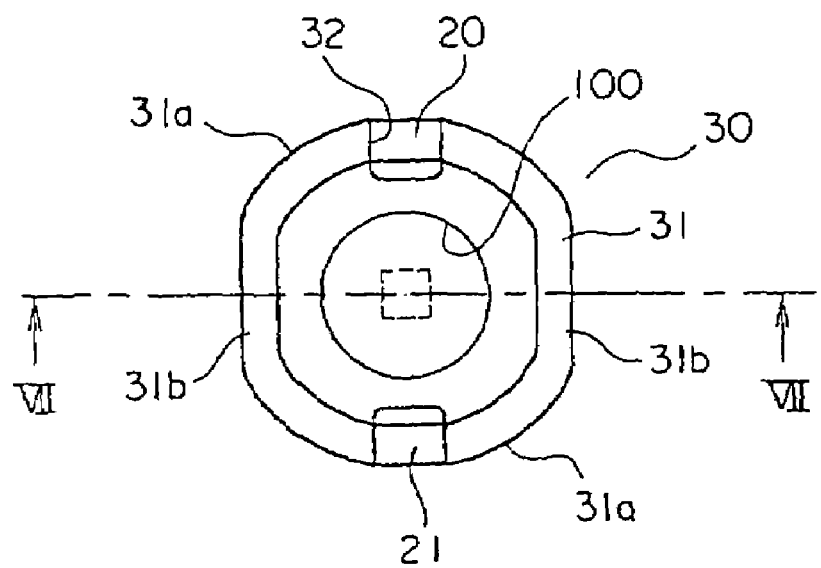
FIG. 6 is a plan view of the magnetic circuit of a rotation angle detection device according to Embodiment 2 of the present invention.
Figure 7:
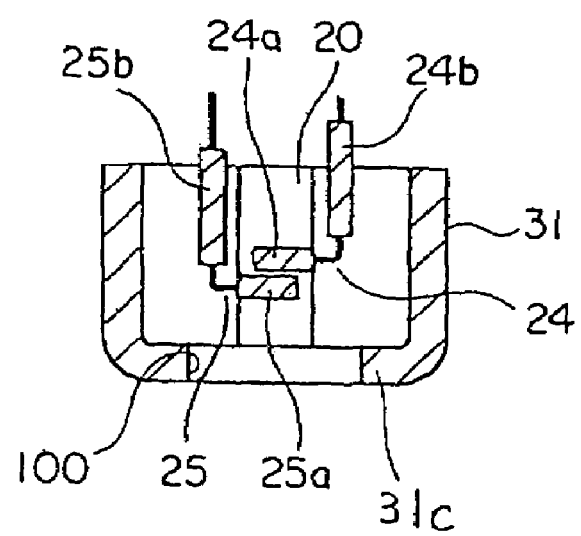
FIG. 7 is a sectional view of the magnetic circuit of FIG. 6, taken along the arrow line VII-VII.

FIG. 6 is a plan view of a magnetic circuit 30 of a rotation angle detection device according to Embodiment 2, and FIG. 7 is a sectional view of the magnetic circuit of FIG. 6, taken along the line VII-VII.

In this embodiment, the magnetic circuit 30 is composed of a cylindrical yoke 31 having a pair of cutouts 32 opposed to each other and a through-hole 100 at the bottom, and a first permanent magnet 20 and a second permanent magnet 21 fitted into the cutouts 32. The yoke 31 has curved portions 31a arranged on both sides of the cutouts 32. The portions between the curved portions 31a are formed as flat portions 31b opposed to each other.

Otherwise, this embodiment is of the same construction and operation as Embodiment 1.

In this embodiment, the yoke 31 is composed of a single component, so it is possible to achieve a reduction in the number of components as compared with the rotation angle detection device of Embodiment 1.

Further, the requisite accuracy in terms of the opposing positions of the flat portions 31b can be achieved solely through the control of the machining precision for the yoke 31.

Further, a flange portion 31c around the through-hole 100 helps to prevent intrusion of an electromagnetic wave into the interior from the bottom side of the yoke 31, so by directing the bottom portion in the direction in which an enhanced shielding effect with respect to an electromagnetic wave is required, it is possible to reduce the influence of an electromagnetic wave from an electromagnetic field generating product in close proximity to the intake control device 1 according to the layout in the engine room, which differs from vehicle to vehicle.

Otherwise, the effect of this embodiment is the same as that of Embodiment 1.

It goes without saying that the rotation angle detection device of the present invention is also applicable to devices for detecting the rotation angles of various rotary members other than an engine intake control device for detecting the opening degree of a throttle valve.

What is claimed is:

1. A rotation angle detection device comprising:
   a cylindrical magnetic circuit mounted to a rotary member; and
   a non-contact sensor provided in an inner void of the magnetic circuit,
   wherein the magnetic circuit is composed of a yoke formed of a magnetic material and having a pair of flat portions parallel and opposed to each other, and a pair of permanent magnets whose magnetic poles are aligned in a same direction so that magnetic fields whose magnetic fluxes are parallel to each other are generated in a void between the flat portions, and
   wherein the non-contact sensor detects a rotation angle of the rotary member by detecting a change in the direction of the magnetic fluxes;
   wherein the yoke is of a cylindrical configuration with a pair of cutouts into which the permanent magnets are fitted with each of the permanent magnets being fitted in curved portions of the magnetic circuit;
   wherein each of the flat portions of the yoke is disposed between the curved portions of the yoke;
   wherein a cross-sectional area of the flat portions within the yoke is smaller than a cross-sectional area of the curved portions of the yoke; and
   wherein each flat portion comprises a straight, non-curved portion.

2. A rotation angle detection device according to claim 1, wherein the yoke is composed of a pair of first and second yoke portions which are of a same configuration, which have the flat portions in the middle portions of the yoke, and end surfaces of the first and second yoke portions are in contact with the permanent magnets.

3. A rotation angle detection device according to claim 2, further comprising a first non-contact sensor, wherein the first non-contact sensor comprises a first magnetism detecting portion containing a first magnetoresistive element which detects a direction of magnetic flux, and a first output operation portion operable to perform a first arithmetic operation on an output signal from the first magnetism detecting portion.

4. A rotation angle detection device according to claim 3, further comprising a second non-contact sensor wherein the second non-contact sensor comprises a second magnetism detecting portion containing a second magnetoresistive element which detects a direction of magnetic flux, and a second output operation portion operable to perform a second arithmetic operation on an output signal from the second magnetism detecting portion.

5. A rotation angle detection device according to claim 4, wherein a first permanent magnet of the pair of permanent magnets generates a magnetic flux which flows along a magnetic path formed by an N-pole of the first permanent magnet, the first yoke portion, the inner void, the first and second non-contact sensors, the second yoke portion, and an S-pole of the first permanent magnet.

6. A rotation angle detection device according to claim 4, wherein a second permanent magnet of the pair of permanent magnets generates a magnetic flux which flows along a magnetic path formed by an N-pole of the second permanent magnet, the first yoke portion, the inner void, the first and second non-contact sensors, the second yoke portion, and an S-pole of the second permanent magnet.

7. A rotation angle detection device according to claim 1, wherein the flat portions are of a same width and of a same wall thickness.

8. A rotation angle detection device according to claim 1, wherein the pair of flat portions increase a magnetic flux between the pair of flat portions in relation to curved portions of the magnetic circuit.

* * * * *